(12) United States Patent
Rudrakar et al.

(10) Patent No.: US 12,412,183 B2
(45) Date of Patent: Sep. 9, 2025

(54) SYSTEM AND METHOD FOR DETECTING FRAUD AND INSIDER TRADING

(71) Applicant: Actimize Ltd., Ra'anana (IL)

(72) Inventors: Nikhil Jivanrao Rudrakar, Pune (IN); Mayuresh Suhas Gulavani, Pune (IN); Salil Dhawan, Kharadi Pune (IN)

(73) Assignee: Actimize Ltd., Ra'Anana (IL)

( * ) Notice: Subject to any disclaimer, the term of this patent is extended or adjusted under 35 U.S.C. 154(b) by 0 days.

(21) Appl. No.: 18/338,622

(22) Filed: Jun. 21, 2023

(65) Prior Publication Data

US 2024/0428270 A1 Dec. 26, 2024

(51) Int. Cl.
*G06Q 40/00* (2023.01)
*G06Q 30/018* (2023.01)
*G06Q 40/04* (2012.01)

(52) U.S. Cl.
CPC ......... *G06Q 30/0185* (2013.01); *G06Q 40/04* (2013.01)

(58) Field of Classification Search
None
See application file for complete search history.

(56) References Cited

U.S. PATENT DOCUMENTS

2017/0301024 A1* 10/2017 Dalal ............... G06Q 40/06

* cited by examiner

*Primary Examiner* — Olabode Akintola
(74) *Attorney, Agent, or Firm* — PEARL COHEN ZEDEK LATZER BARATZ LLP

(57) ABSTRACT

A system and method may detect rogue trading by detecting a subset of trades among a plurality of trades, where each trade in the subset does not meet a trade surveillance system threshold, and does meet a trade surveillance system threshold within a tolerance, and each trade falls within the same time period. A ratio of the subset of trades to the plurality of trades may be determined. If the ratio is above a threshold, it may be determined that the subset of trades corresponds to undesirable trading. Undesirable trading may be determined using an additional factor, based on a weighted average of, for each of a trade surveillance system threshold, the number of trades in the subset meeting the trade surveillance system threshold within a tolerance and not meeting a trade surveillance threshold, times a weight based on the position of the threshold in the trade surveillance system.

15 Claims, 11 Drawing Sheets

Rogue Trading Pattern Detection Block Diagram

SYSTEM AND METHOD FOR DETECTING FRAUD AND INSIDER TRADING

FIELD OF THE INVENTION

The present invention relates generally to detecting rogue or undesirable trading; more specifically, embodiments may detect attempts to defeat rogue or undesirable trading detection technology.

BACKGROUND OF THE INVENTION

Technology exists for trade surveillance and market surveillance, monitoring the activities of traders, a firm or its employees to detect illegal and unethical trading practices, such as market manipulation, fraud, money laundering, insider trading, speculation, and unsuitable investments. As such technology evolves, market manipulators update their techniques. Manipulators may perform reconnaissance to gauge insider trading detection technology thresholds, and place orders to bypass the logic of the technology or test whether certain trades violate certain thresholds. Manipulators may receive "backdoor" or insider information or insights regarding surveillance system thresholds, e.g. from personnel with knowledge of the system, and can react, for example by performing reconnaissance trades to test what thresholds exist (e.g., after receiving thresholds from those with inside information), or by breaking their manipulations or trades into parts to achieve the desired results. Such insider trading technology may inadvertently guide bad actors in the direction of the system's target, so that it is easier for the bad actors to deliberately hit or miss the target. Such reconnaissance or backdoor information is difficult to track and audit. Smart manipulators of such systems may receive details re such systems, such as filter thresholds, or whether or not the manipulator has been flagged by the system, via unsupervised communication channels, and then test the thresholds.

For example, a bad actor may conduct a few transactions early in a day which are detected and result in alerts according to detection technology, and the bad actor may use this information to conduct further transactions which are able to bypass a threshold of the technology, e.g. just below the threshold line: the bad actor avoids detection by avoiding the threshold by a small margin. In some cases this requires bad actors knowing some vital details about the detection algorithm.

There is a need to detect such patterns and mark such suspicious behavior for investigation.

SUMMARY OF THE INVENTION

A system and method may detect rogue trading by detecting a subset of trades among a plurality of trades, where each trade in the subset does not meet a trade surveillance system threshold, and does meet a trade surveillance system threshold within a tolerance, and each trade falls within the same time period. A ratio of the subset of trades to the plurality of trades may be determined. If the ratio is above a threshold, it may be determined that the subset of trades corresponds to undesirable trading. An additional measure of a rogue trade may be included: for the subset of trades, a weighted average may be calculated of, for each of a trade surveillance system threshold, the number of trades in the subset meeting the trade surveillance system threshold within a tolerance and not meeting a trade surveillance threshold, times a weight for the threshold, the weight being based on the position of the threshold in the trade surveillance system. It may be determined that the subset of trades corresponds to undesirable trading if the ratio is above a threshold and also if the weighted average is above a threshold.

Prior art methods to detect suspicious trading focus on trader communications, e.g. with other individuals. Prior art surveillance systems may use trading channels like trades, chats, and calls (e.g. audio or video) to identify behavioral frauds in which communication data is a must. Embodiments of the present invention may improve technology by, for example, identifying patterns exhibited by the trader who has some understanding of how s/he can bypass the static models with static thresholds we have in the system. Embodiments of the invention may detect patterns where the trader is trying to cheat the system by bypassing the static thresholds (e.g. by smaller margins) put in the analytics. Embodiments of the invention may be able to detect manipulations which are performed in steps (e.g. dividing a trade into multiple smaller trades) to avoid the prior art detection technology. Embodiments may improve technology by detecting rogue traders without surveilling the communication data of traders, as embodiments may use instead pattern recognition. Traditional suspicious detection technology require trader communication data, without which it is impossible for such technology to trace such activities.

Traditional analytics technologies identify trade patterns that fall within specified thresholds, leaving manipulative activity that falls outside these thresholds undetected. Embodiments of the present invention may close that gap and improve such technology by providing additional methods to detect risks from rogue employees.

BRIEF DESCRIPTION OF THE DRAWINGS

Non-limiting examples of embodiments of the disclosure are described below with reference to figures attached hereto that are listed following this paragraph. Identical features that appear in more than one figure are generally labeled with the same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not of limitation in the figures of the accompanying drawings, in which like reference numerals indicate corresponding, analogous or similar elements, and in which:

DETAILED DESCRIPTION OF THE INVENTION

Figure 1:
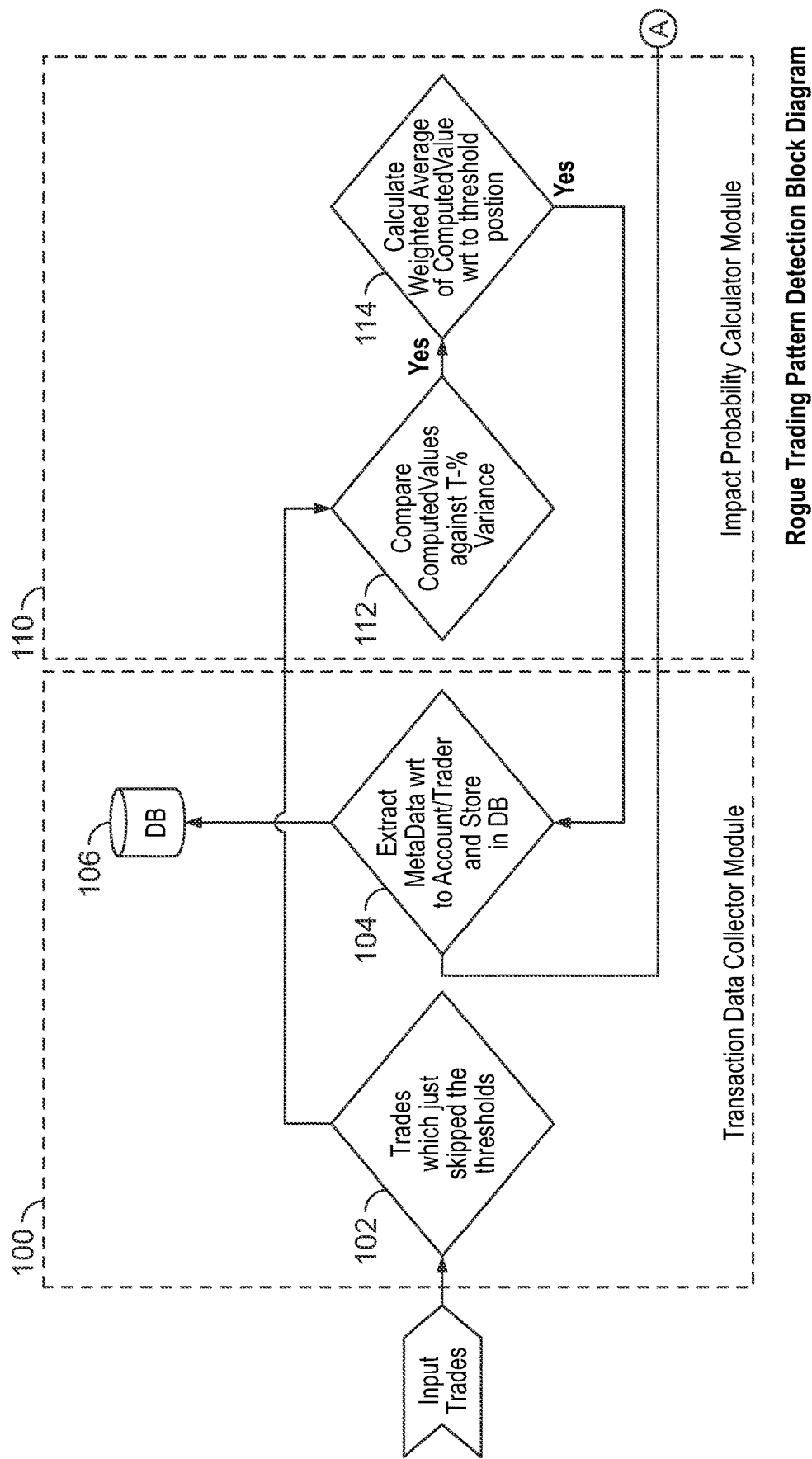
FIG. 1 depicts modules for determining if rogue trading occurs, according to one embodiment.
Figure 1:
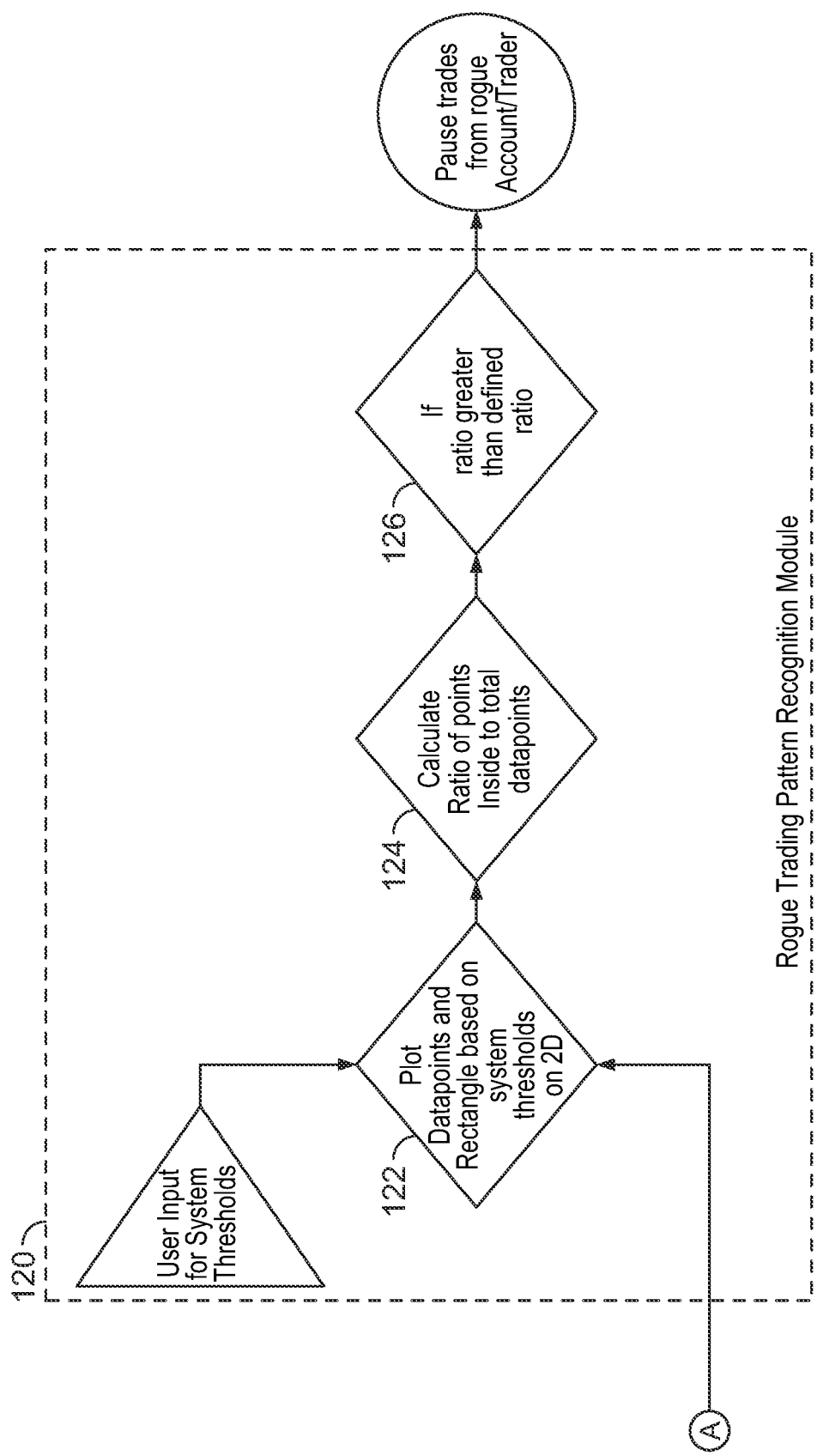

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items.

Unless explicitly stated, the method embodiments described herein are not constrained to a particular order in time or to a chronological sequence. Additionally, some of the described method elements can occur, or be performed, simultaneously, at the same point in time, or concurrently. Some of the described method elements may be skipped, or they may be repeated, during a sequence of operations of a method.

Embodiments of the invention may detect reconnaissance trades (e.g. "recce trades") in a timeline, where the reconnaissance trades may help manipulators understand the ways to bypass the trade surveillance technology. The pattern of occurrences may be analyzed for occasions when a trader's transactions are skipped or not flagged by suspicious activity technology, if the transactions are just below a relevant detection threshold (e.g. has metadata, such as price or volume which falls below a threshold which if met would cause the triggering of an undesirable trade alert) and thus bypassed the detection algorithm, but where the metadata of the transactions are within a threshold distance of having metadata at would be detected as suspicious. While in for some thresholds trade metadata (e.g. volume, price, etc.) may be compared to a threshold, some trades may be compared to a threshold using values not specifically compared to trade metadata, such as values derived or calculated from trade metadata and possibly other data. For example, the price of a security predicted to result from a trade may be calculated; or the overall market volume of trading for a security which is the subject of a trade may be determined, and one of these or other values may be evaluated to see if does not meet a trade surveillance system threshold when adjusted (e.g. downward) by a tolerance.

Such bypassed transactions or trades, where the trade does not meet a trade surveillance system threshold, and does meet a trade surveillance system threshold within a tolerance, may be called "just skipped", and may be collected and analyzed for impact probability. Such a detected behavioral pattern may confirm the relevant trader has backdoor information about the system or has reconnoitered the system to bypass the detection logic, or is otherwise conducting undesirable trading. Based on "backdoor information", e.g. insider information, about how detection algorithms work, and the value or importance of thresholds set for the detection algorithms, a trader may place the transactions accordingly to just bypass the system and can still achieve targeted manipulations.

Such a trade surveillance technology system may work for example with marking the close technology, which may detect clients or traders engaged in trading just prior to the market close with the intention of manipulating the closing price. If price moves beyond threshold a system may flag the trade that moves the price. Trade surveillance technology may extract metadata from a trade, e.g., number of shares, and calculate a predicted price rise for a security associated with the trade, for example based on market data for the security (e.g., Open, High, Low and Close data) received for the security, or instrument, at a given point in time. Such market data may be requested from markets or exchanges directly, or from third party market data providers. A rogue entity may attempt to split a trade to avoid such detection: if the entity knows a threshold is a price rise of 5%, the entity may send four trades each predicted to move a price 4.9% to move the total price 20%. An entity may engage in front running, and place an order for X shares for a stock, which may move the price; another entity may place an order for the same stock first to take advantage of a planned price rise due to the first entity's order. Conventional technology may attempt to detect this using a threshold of the percentage change in value of the stock from a trade. If the threshold is, e.g., 10%, an entity may place order so a price rises only 9.9%. Conventional trade monitoring technology may not detect such manipulations; embodiments of the invention provide technology that may detect such manipulation (in such an embodiment it is a value calculated based on the trade or metadata, not the metadata, which is compared to a threshold). Trade surveillance technology other than marking the close technology may be used; for example modules may detect insider trading or other undesirable trading.

FIG. 1 depicts modules for determining if rogue trading occurs, according to one embodiment. Rogue or undesirable trading may be detected using a weighted average of just skipped or other filters. Trade surveillance technology may include one or more trades analytical models (e.g., a marking the close model, a front running model, etc.), each with one or more filters, where in each filter some trade metadata or computed value is compared against a threshold. These filters may exist in different stages (the stages with filters having different positions) of the surveillance or detection module. A trade bypassing (e.g. "just skipping", e.g. meeting each trade surveillance system threshold within a tolerance and not meeting a trade surveillance threshold) a filter that is in the early (e.g. closer to the input) stage of a detection model may be considered to have a lower impact, or be less suspicious, than a trade "just skipping" a later stage. Earlier stages in such models may use filters that are less salient to rogue trading. Bypassing filters that are in the middle and last stages of the detection module may have moderate and high impact, respectively. Some rogue trade detection systems only generate an alert if the last stage is bypassed, and an entity's trade breaches earlier stages they may not be flagged as rogue if that trade does not also breach the last stage. In some models, each filter or stage may be for a different metric or aspect of metadata, An example early filter might include average daily volume for a stock, or a size of a trade; if volume or size of trade is lower than X the model might deem the trade not rogue, and later filters (such as change in price resulting from a trade) will not be used in that model for the input trade. In some embodiments, each threshold or filter may have associated with it a weight, correlated to probability of impact, e.g. how impactful is this threshold or filter to detecting rogue trading, typically based on the position in the model of the threshold or filter.

Referring to FIG. 1, an embodiment may (e.g. using a transaction data collector module 100 collecting input data from trade analytics algorithms) input trades from analytical models (e.g. part of trade surveillance module 312, FIG. 3; or trade surveillance module 400, FIG. 4) where surveillance may be performed, and identify which trades or transactions were bypassed or just skipped (operation 102) and at which stage or threshold of detection logic, and pass this information to an impact probability calculator module 110 to assess further. Along with trades, metadata may be extracted (operation 104) such as account/trader associated with the trade, computed values, and position of threshold in the analytical model. Such data may be stored in database 106. Metadata and a probability or weighted average may be stored for analysis for a particular entity; in some embodiments impact calculator module 110 may produce a weighted average or probability which may be stored by data collector module 100 and later used by pattern recognition module 120.

Impact probability calculator module 110 may, for each stage in one or more trades analytical models, compare trade metadata (or data generated by analyzing the trade, e.g. against the market in which the security associated with the trade exists) against a threshold adjusted by a variance or tolerance (operation 112, e.g. the compared-to value may be threshold minus variance, or threshold reduced by a percentage defined by variance, or another value of threshold adjusted by variance), calculate the impact probability of the transaction (e.g., using a weighted average, operation 114) and determine or assign a weight to the transaction based on the position of the threshold in the trade surveillance system where the transaction was just skipped. For example, for a subset including just skipped trades associated with a trader or account, a process may determine a weighted average of, for each of a plurality of trade surveillance system thresholds, the number of trades in the subset meeting each trade surveillance system threshold within a tolerance and not meeting a trade surveillance threshold, times a weight for the threshold, the weight being based on the position of the threshold in the trade surveillance system: if the calculated weighted average is above a threshold, rogue trading or undesirable trading may be detected.

Data may be fed to a pattern recognition module 120, which may use machine learning (ML) or other techniques to identify rogue trading or reconnaissance. Pattern recognition module 120 may detect a rogue trader's pattern using an algorithm that plots data and a shape (operation 122), or which conducts the algorithmic equivalent of such plotting. For example, pattern recognition module 120 may plot, e.g., a rectangle or shadow region on a graph, in two dimensions (2D), and plot trades as data points in 2D based on, e.g., user input received for system thresholds (e.g. thresholds used by embodiments of the invention); such an algorithm may define which data points lie within the rectangle and which do not. Such a rectangle may be defined at least in part by a trade surveillance system threshold and a tolerance adjusting that threshold. Based on the calculated ratio (operation 124) of a subset of data points or trades inside the rectangle to total trades or data points an algorithm may decide (operation 126) whether the account or trader is involved in rogue trading activity or not. A machine learning embodiment may use a linear regression machine learning model to detect data points inside the rectangle. Such a rectangle can be defined using four linear equations (e.g., $y=mx+b$).

In some embodiments, an actual rectangle need not be used. For example, a process may determine rogue trading based on a statistical analysis, possibly analogous to a shape-plotting method. In one embodiment a process may detect a rogue traders' pattern by identifying a subset of trades among a plurality of trades, where each trade in the subset does not meet a trade surveillance system threshold (e.g. includes metadata, or for which calculations result in data such as market moves, which fall below a threshold which if met would cause the triggering of an undesirable trade alert), and also does meet a trade surveillance system threshold within a tolerance (e.g. the metadata or calculation result is above the threshold when adjusted downward by the tolerance), and each trade falls within the same time period; then may determine a ratio of the subset of trades to the plurality of trades. Typically the ratio of trades is calculated using trades associated with one entity, e.g. a trader, institution or account. If the ratio determined by a pattern recognition or other algorithm is greater than a defined system threshold for the ratio then the algorithm can deem that the subset of trades corresponds to undesirable trading, e.g. confirm a rogue trader is detected. Actions may be taken (operation 128): for example once a pattern is detected, as is the entity or trader involved in it, a notification may be sent to a party (e.g. a bank, asset management company (AMC) or a firm) to pause trades from the trader until the investigation completes. A watchlist may also be maintained for future actions, to enable taking preemptive actions against rogue traders. While specific modules or models are described herein, embodiments may not divide functionality according to the specific example modules described.

Figure 2:
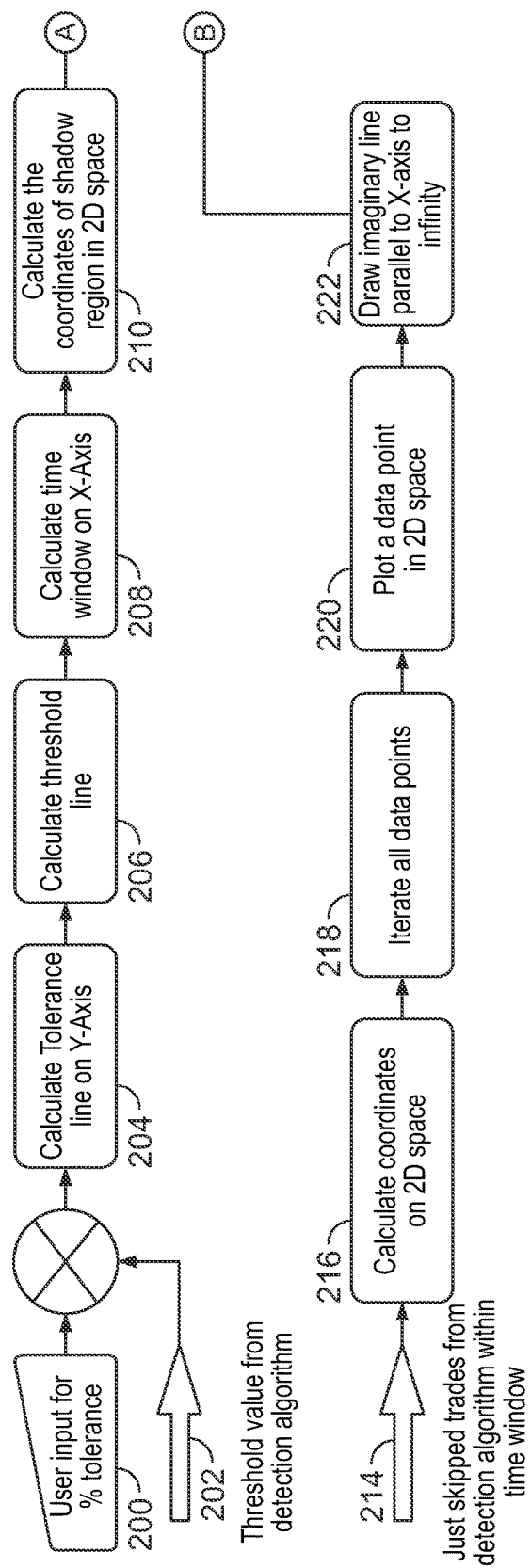
FIG. 2 depicts a process for determining if rogue trading occurs, according to one embodiment.
Figure 2:
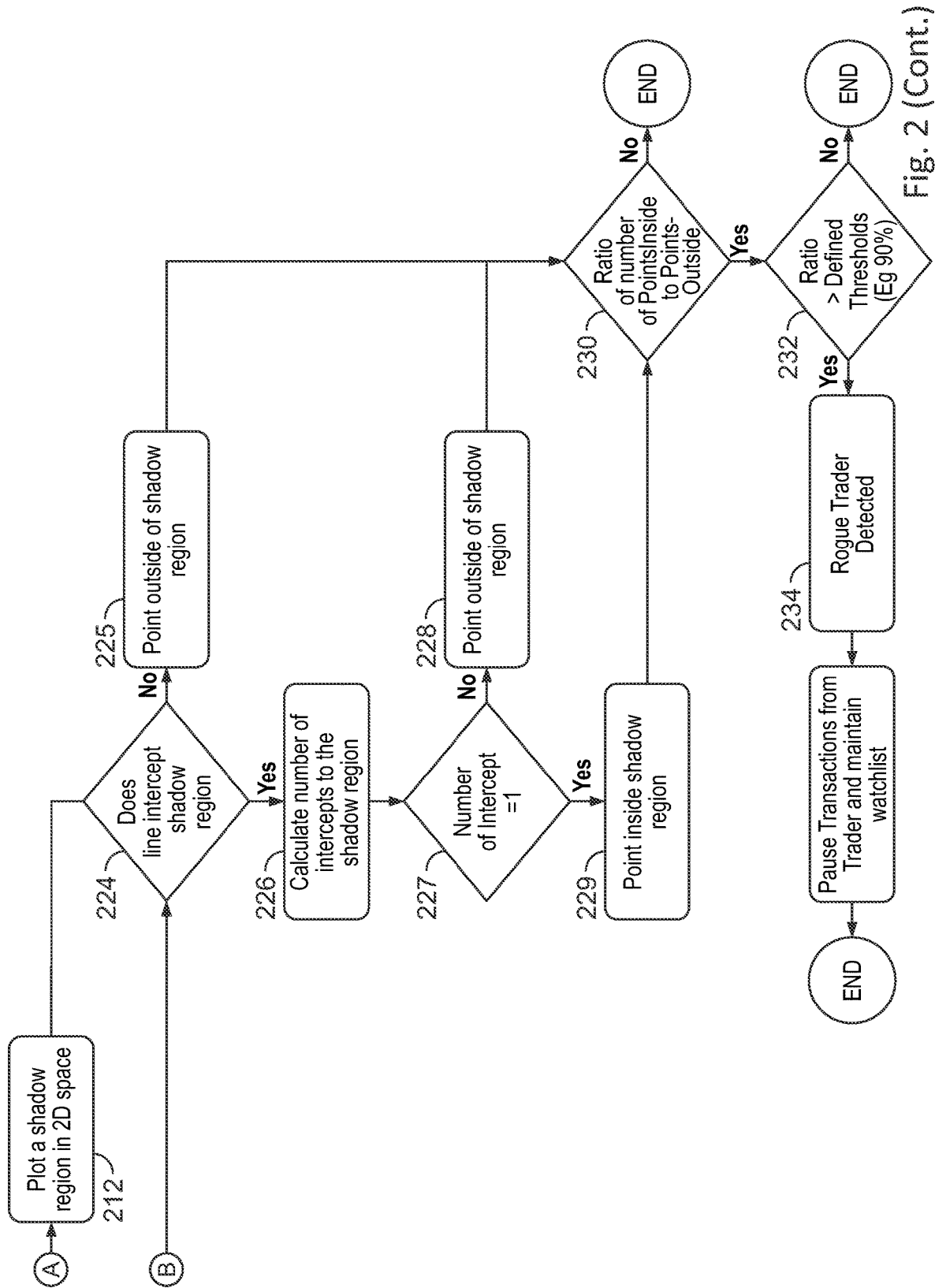

FIG. 2 depicts a process for determining if rogue trading occurs, according to one embodiment. In operation 200, a user may input a tolerance, e.g. as a percentage or other type of value. In operation 202, a threshold value used by a trade surveillance system may be input or received. In operation 204 a tolerance line may be placed on or perpendicular to a Y-axis of a graph. In operation 206 a threshold line may be placed on or perpendicular to a Y-axis of a graph. In operation 208 a time window may be placed on or perpendicular to a X-axis of a graph, for example, the X axis itself may be the beginning of the time window, and a line perpendicular to the X axis may be the end of the time window. In operation 210 the coordinates of a shadow region, e.g. region 600 in FIG. 6, may be determined; the shadow region may be defined by the tolerance line, threshold line, and beginning and end of the timeline. In operation 212 a shadow region may be plotted in 2D space. The time window may define a period of time in which to identify a pattern based on, e.g. a user's suspicions, or defined by a compliance office, and/or based on external information. A user such as a supervisor may enter time definitions for such a window, e.g. using supervisor computer 320 and/or a user in such as shown in FIG. 7. For example, examining a month of trade data for an entity may not allow identifying undesirable trading, as rogue traders often perform rogue trading within a shorter time period.

In operation 214, just skipped trades, or data describing just skipped trades, e.g. from a detection algorithm, may be received. In operation 216, the coordinates in the 2D space for a received trade may be calculated, and in operation 218, the process for calculating a coordinate in 2D space may be iterated for all received points. In operation 220, the received trades may be plotted in 2D space using the calculated coordinates. A process may then determine which points are inside and outside the rectangle, and which points to use for a calculation and which to ignore. For example, a linear regression algorithm may be used to determine which points to ignore. In one embodiment, this is performed in operation 222, where a line parallel to the X axis, from a plotted received trade, to infinity, may be drawn for each plotted trade which is between the threshold and tolerance line (such that lines outside the area defined by the threshold line and tolerance line are ignored for calculation, but may be plotted for reference). In operation 224, for each line created in operation 222, it is determined if the line intercepts the shadow region; if not, it may be determined that this point is outside the shadow region (operation 225). The number of intercepts may be calculated in operation 226. In operation 227, it may be determined if the number of intercepts is 1. For each line intercepting the shadow region, if the number of intercepts is not one (operation 228), it is deemed that this point is outside the shadow region, and if the number of intercepts is one (operation 229), it is deemed that this point is inside the shadow region. Operations 220-229 may be repeated for each of the plotted trades. In operation 230, a ratio of the number of points deemed inside the shadow region to the number of points deemed outside the shadow region may be determined. If the ratio is above a threshold (operation 232), a rogue trader may be detected (operation 234).

An embodiment may use one or both of detecting a rogue entity's pattern and a weighted average of "just skipped" filters to detect rogue or undesirable trading. For example, if both 1) a ratio of skipped trades associated with an entity to all trades associated with the entity (e.g. for a certain time period) is above a threshold, and also 2) for the just skipped trades associated with the entity, a weighted average of, for each of a trade surveillance system threshold, the number of trades within a tolerance and not meeting a trade surveillance threshold, times a weight for the threshold (the weight based on the position of the threshold in the trade surveillance system), is above a threshold, then rogue or undesirable trading is detected. While in some embodiments, both pattern recognition findings and a weighted average of "just skipped" filters are used to produce a finding of rogue trading (e.g. an "and" function), other embodiments may determine rogue trading for a positive result from one or the other, or one such module need not be included.

Figure 3:
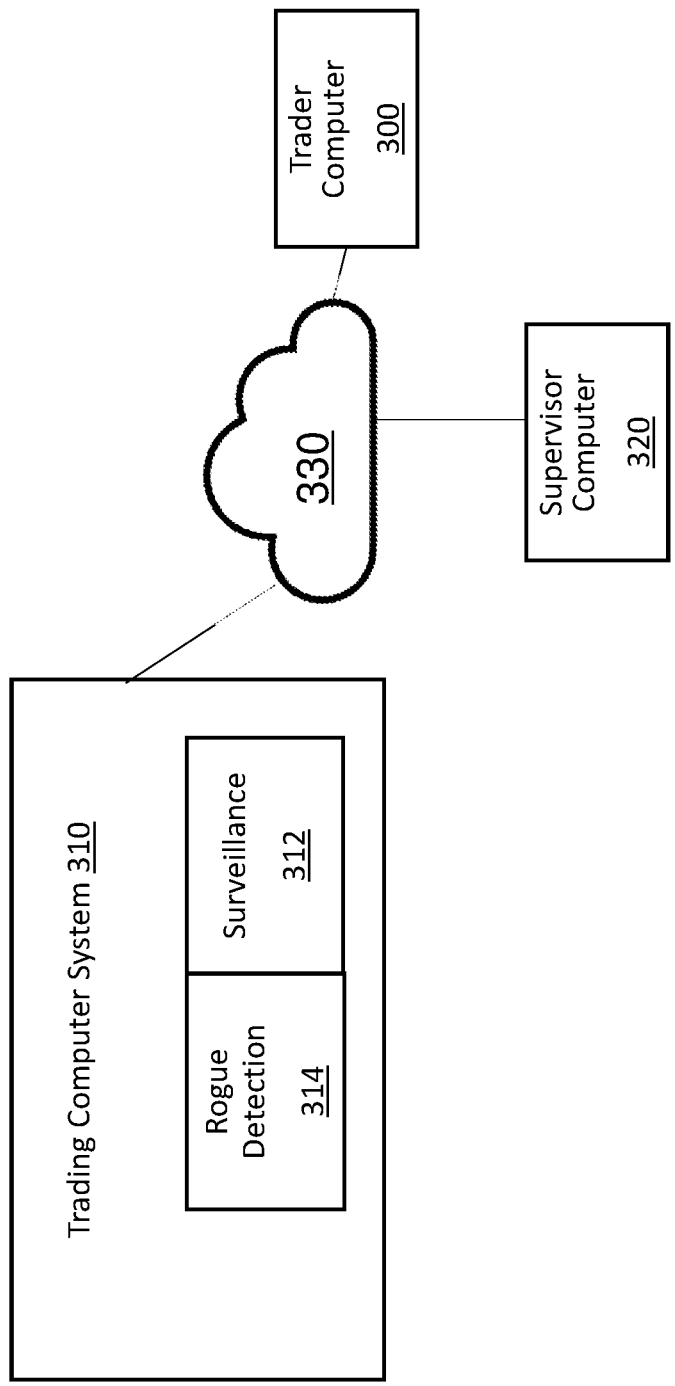
FIG. 3 is an overview of a system according to illustrative embodiments of the present invention.

FIG. 3 is an overview of a system according to illustrative embodiments of the present invention. One or more trader computers 300 may be operated by traders or other entities to execute trades, or to engage in undesirable trading activity. A trading system 310 (e.g. a server, a cloud-based system, etc.) may receive and execute trades, typically in combination with other systems, and may include trade surveillance module 312, detecting rogue trading, e.g. by including systems including stages and thresholds. Trading system 310 may include rogue trading detection module 314, which may carry out embodiments of the present invention. One or more supervisor or auditor terminals 220 may allow personnel to review alerts re rogue trading, enter thresholds and other system parameters, and view reports (e.g. as shown in FIG. 7). The various systems may be connected by network 330 (e.g. one or more intranets, the Internet, or other networks).

While different modules and systems, e.g. trading system 310, trade surveillance module 312, rogue trading detection module 314, etc., are shown placed in certain combinations, such systems may be executed by different computing systems, or exist in different combinations of components.

A transaction data collector module may extract initial data (e.g. input trades) from trade surveillance technology such as a trades analytical model. Such initial data may include trades or orders not flagged as suspicious by trade surveillance technology, but which are "just skipped", e.g. flagged as possible reconnaissance or probing trades, e.g. based on some metadata being close to, but not violative of, trade surveillance thresholds or limits. Early stages of a trades analytical model may have business logic where some computed value may be created based on trade metadata. In the example of a marking the close detection algorithm, a "quantity" may be calculated, as the sum of all quantities of orders for a certain security; this computed quantity may be compared against a quantity threshold and quantity threshold with tolerance. Metadata extracted may include, for example symbol (e.g. an identifier for the security, timestamp for the trade, and entity (e.g. account or trader).

These computed values may be compared against trade surveillance technology thresholds which may be defined to filter out (e.g. remove) transactions that are not suspicious and identify transactions which are suspicious. A rogue trader may use insider information about the analytical model's thresholds and may deliberately place transactions in ways so that it will just skip or avoid the thresholds, such that the trade surveillance technology does not identify the trades as being suspicious, in order to test the model and the insider information; alternately a rogue trader may make such reconnaissance trades without the benefit of insider information. In prior art systems, a rogue trader may receive feedback when a trade sent by the rogue trader is flagged, e.g. officially or through backdoor or insider channels. A rogue trader may achieve its desired output by repeatedly doing this (e.g. in the context of Marking the Close manipulations) and avoids its trades getting caught in the analytical models, and being flagged as suspicious trades.

A transaction data collector module may collect or identify trades which just skipped the thresholds by using a defined % variance or tolerance. For example trades which were not flagged or identified as suspicious, and yet had some metadata which was within a certain tolerance, value or threshold of a suspicious threshold, may be identified or flagged as possible reconnaissance or probing trades. For example, if a threshold is for 10% price manipulation (e.g. a trade which moves the price by 10% would trigger this filter) and a tolerance or variance of 0.5% is defined then all trades having price manipulation within 9.5% to less than 10% may be just missed trades (e.g. missed by traditional technology) and collected by a transaction data collector module. A tolerance or variance may be an absolute amount (e.g. 0.5 subtracted from 10 in the example just given), or in another embodiment another form, such as percentage of a threshold. Collected data (e.g. transactions which are not flagged as suspicious but which are flagged as reconnaissance) may be sent to an impact probability calculator module. Based on the response or analysis from an impact probability calculator module, details such as account/trader, computed values, threshold position, and probability may be extracted. Such information may be saved in a database for future purposes where the pattern recognition model will use this data.

Figure 4:
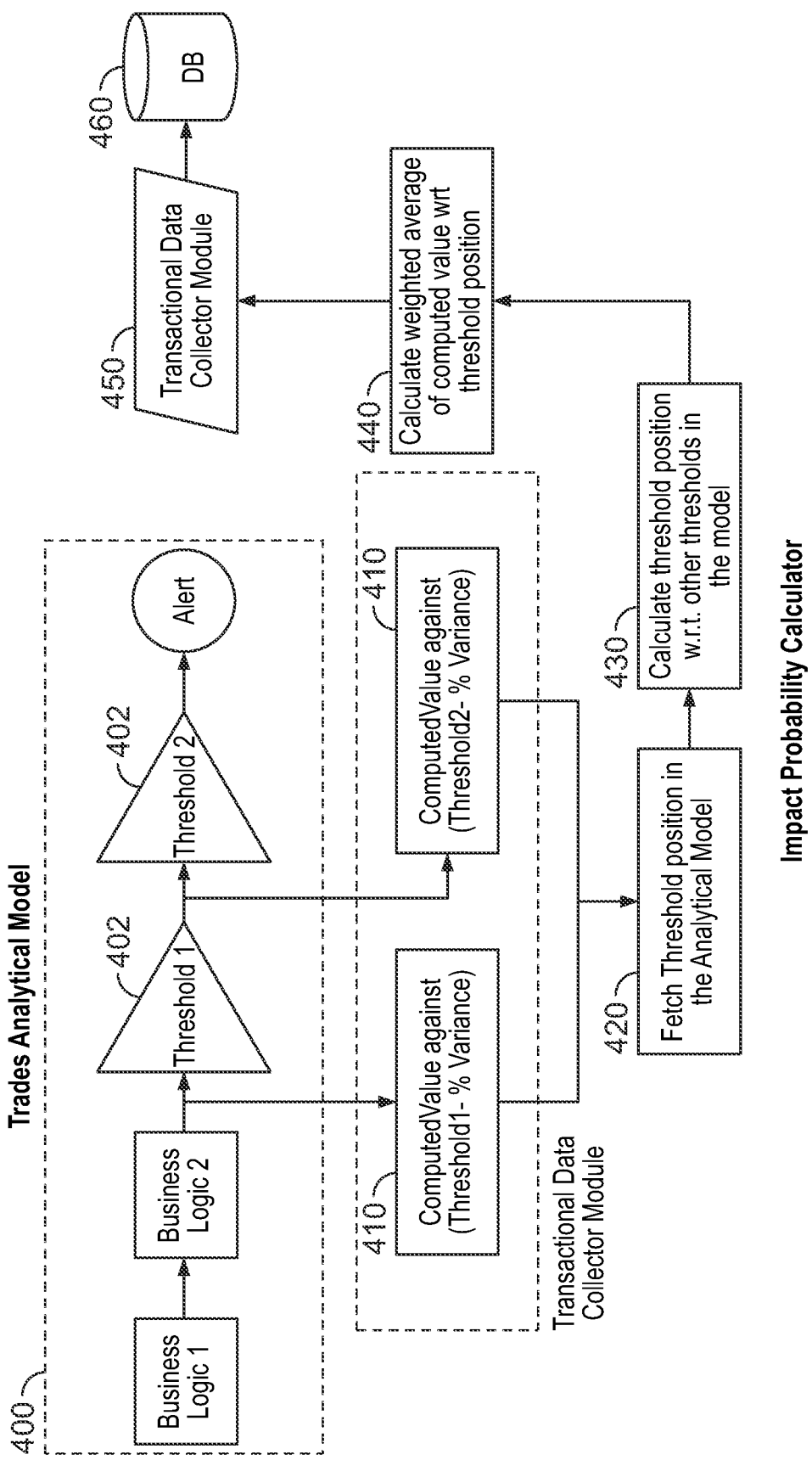
FIG. 4 depicts an impact probability calculator module according to some embodiments.

FIG. 4 depicts an impact probability calculator module according to some embodiments. An impact probability calculator module may, based on data such as trades received from a transaction data collector, calculate the impact probability (e.g. the probability that (or a weighed average measuring that) a transaction that misses threshold(s) within tolerance(s) are undesirable or rogue), for example based on the position (e.g. earlier, more towards model input, or later, more towards model output and calculated after earlier stages) of a threshold where a transaction is just skipped from a trade surveillance system (which may include multiple business logic modules such as trades analytical models, each including one or more thresholds). For example, an early threshold or stage may act as a filter for an input transaction, and only if the trade meets the threshold is the trade compared against a second, later stage or filter, and only if the trade meets the second threshold is the trade compared against a third, latest stage or filter. If the trade fails any of the stages or filters it is not flagged by a traditional system, and analyzing trades that fail filters based on tolerances may find rogue traders.

Referring to FIG. 4, data may be collected (e.g. from a trade surveillance module 400, which may be analogous to trade surveillance module 312) and compared to thresholds 402 modified by variances or tolerances (e.g. operations 410). Just skipped transactions may have the position of the threshold that resulted in the just skipped trade input (operation 420), and the position of each such just skipped threshold may be determined relative to other thresholds in a particular model (operation 430), e.g. to produce a weight for each threshold. If the transaction was just skipped (e.g. not flagged as suspicious as not having metadata above a threshold, but having metadata within a tolerance or distance to a threshold) by the model at an early position or stage of the analytical model then the impact (e.g. likelihood of being rogue) of that transaction may be less. However, if the transaction was just skipped at a later or the last position or threshold, after its relevant metadata exceeded one or more earlier thresholds, and where it was about to but just failed to trigger an alert, then just skipping that threshold may have a big impact or be more likely to be rogue. Other threshold skips may be calculated to have an impact based on their position in the analytical model.

For example, if there are five positions or thresholds in an analytical model, an impact probability calculator may define or use a weight of each threshold skip; such weights, and other thresholds and tolerances defined herein, may be user-defined. For example, the last threshold may have a weight or multiplier of 1; the threshold before may have a weight or multiplier or 0.8 (in this example, there may be a 0.2 weight reductions for each multiplier, as in this example there are five thresholds). In one embodiment, the factor by which a threshold weight or multiplier may reduce from the last threshold, moving towards earlier thresholds, is 1/number_of_thresholds, such that in the example of a last threshold of 1 and five thresholds, the factor is 1/5=0.2. Continuing with this example, if for a certain entity there are 10 transactions providing data points, and of these 10 five are just skipped (e.g. not flagged as suspicious, but flagged as possible reconnaissance due to being within tolerance) at the last threshold and five were skipped at the second to last threshold, then the weighted average and probability for this entity, for the set of transactions, may be calculated (operation 440) for example by:

(1*5+0.8*5)/10=0.9=90% impact probability or weighted average;

in one embodiment if this is above a threshold, it may determine that undesirable trading exists or it may be part of a determination that undesirable trading exists. This may use an example formula:

ImpactProbability=sum(threshold_multiplier* number_of_datapoints_skipped_in_that_threshold)/total_datapoints In this formula, the sum, for all thresholds in a model, of the weight or multiplier for a threshold times the number of just skipped data points for that threshold (e.g. just skipped trades associated with an entity), is divided by the total number of just skipped datapoints and non just-skipped data points analyzed for the entity.

The impact probability information for a set of trades associated with an entity may be sent to the data collector module (operation 450), and it may be stored in a database (DB) 460 for example to maintain a watchlist of rogue traders. The impact probability metadata may be stored to understand the gravity of such fraudulent activities for future purposes.

Figure 5:
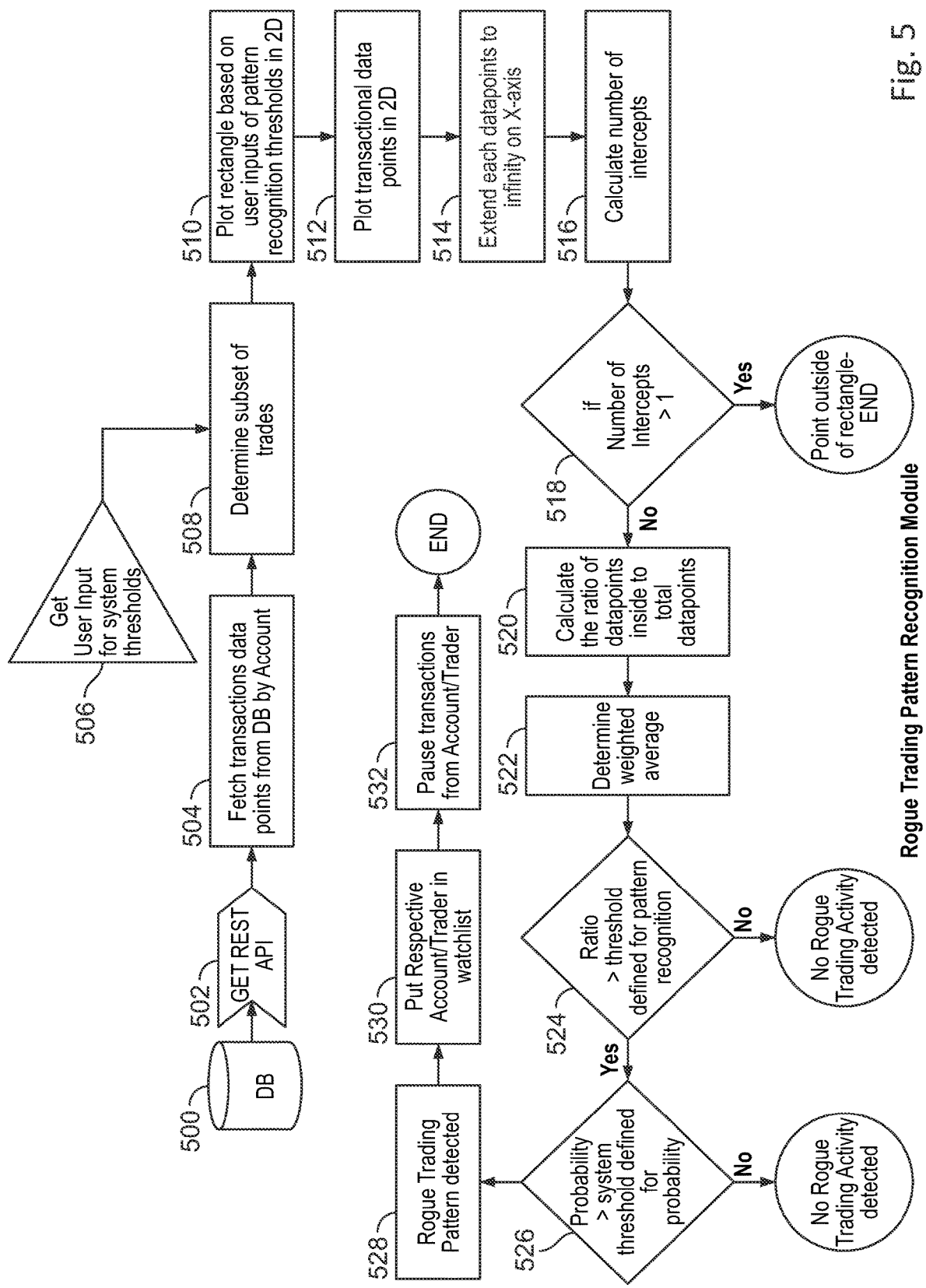
FIG. 5 is a flowchart depicting an embodiment of the invention.

FIG. 5 is a flowchart depicting an embodiment of the invention, e.g. carried out by a rogue or undesirable trading pattern recognition module which may detect a rogue trader's activity. While the operations of FIG. 5 may be carried out the systems of FIGS. 3 and 8, other systems or hardware may carry out embodiments of the present invention.

A module may access a database 500 (which may be the same as or analogous to database 106 in FIG. 1) to obtain trades or transactions associated with a specific entity such as a specific trader or account (operation 504). For example, a GET REST API (502) may be used to fetch the data from the database in which data has been inserted, e.g. database 106 or database 500, e.g. located in the first module. User input may be received (operation 506) for, e.g. thresholds, tolerances, time periods (e.g. start, end to analyze), etc. Account or trader information may be used as a key to fetch the details from the database. A window may be defined in which to run pattern detection.

Figure 6:
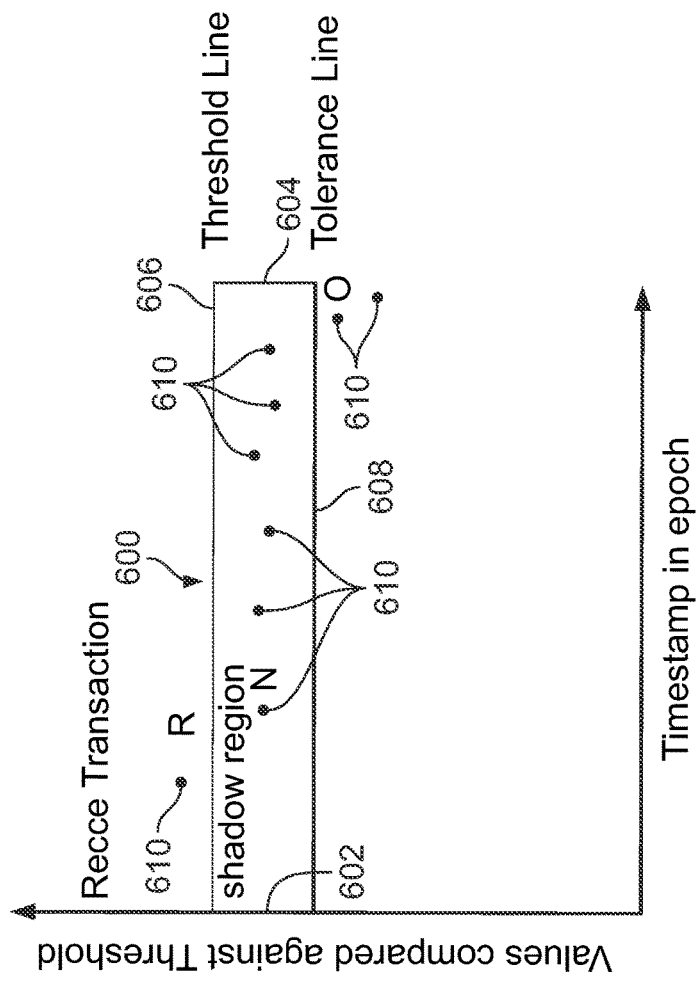
FIG. 6 depicts a shadow window algorithm according to embodiments of the present invention.
Figure 6:
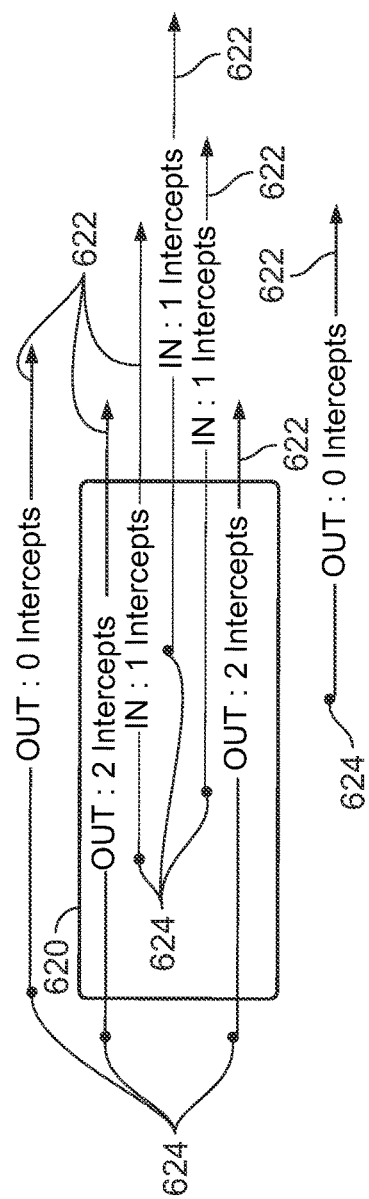
Figure 7:
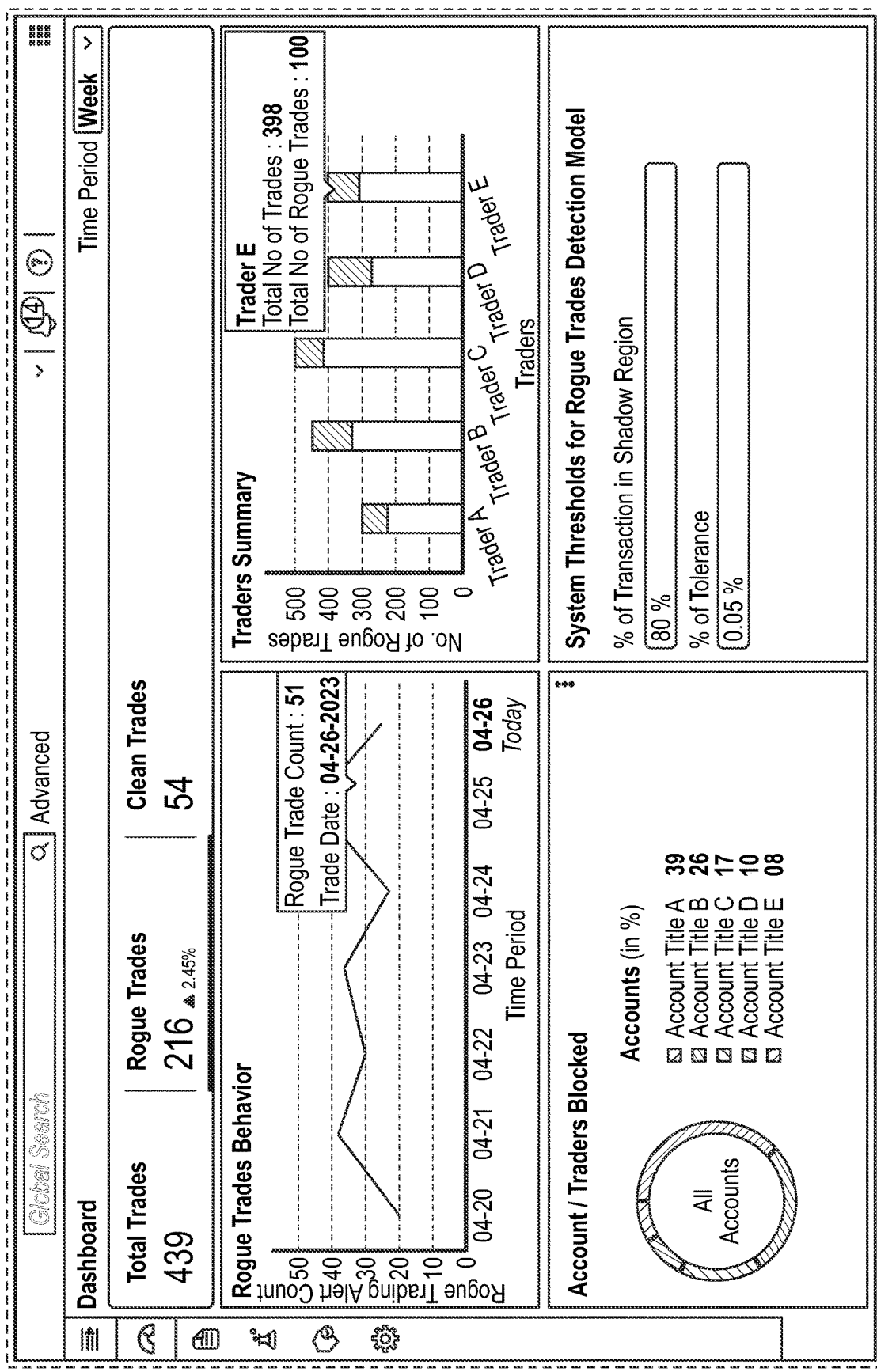
FIG. 7 depicts a sample user interface according to some embodiments.

FIG. 6 depicts a shadow window and window algorithm according to embodiments of the present invention. Referring to both FIGS. 5 and 6, a shape such as a rectangle 600 may be defined, e.g. on a graph, by two lines 602 and 604 perpendicular to the X-axis defining a time window (e.g. user defined), and lines 606 and 608 perpendicular to the Y-axis defining a threshold (e.g. a threshold for determining rogue trading), and tolerance or variance (e.g. altering the amount of the threshold). Trades 610 plotted between the threshold line and the tolerance line, within the time window, may be possible rogue trades, which just skipped detection algorithms, and this region may be termed a shadow region. In one embodiment, trades 610 plotted above line 606 are not considered, as being above the threshold and thus caught by conventional systems; trades plotted below line 608 may be included as the denominator when computing the ratio. Transactions plotted outside of the shadow region may be deemed clean trades; clean trades may be considered trades which are not flagged by traditional, prior art trade surveillance technology and also trades determined to be not rogue according to embodiments of the present invention. A window of for example 12 hours may be defined (e.g. by a user), and variance or tolerance of for example 0.5% may be set (e.g. by a user) to find just skipped trades or transactions. Other window sizes or lengths, and other tolerances, may be used.

In operation 508, a process may detect or identify a subset of trades among trades associated with an entity, where each trade in the subset does not meet a trade surveillance system threshold, and does meet a trade surveillance system threshold within a tolerance, and falls within the same time period. This may be performed by calculations; alternately a process may define a shape, e.g., a rectangle 600, which may be plotted in 2D space (operation 510). All the trades within a certain time window, expressed as data points, for the entity (e.g. identified in operation 504), e.g. account or trader, or some other identifying data to select trades, may be plotted operation 512) in that example 12-hour window. The trades within a certain time window (e.g. defined by a user) may be considered, as patterns may become apparent when data is analyzed within a window where rogue trading is suspected; too many data points may obscure rogue trading. A pattern recognition algorithm, e.g. plotting data points and lines and analyzing the lines, may be used to calculate a ratio of the number of data points which are inside the rectangle vs data points outside the rectangle. A pattern recognition module may extend (operation 514) an imaginary line (e.g. of lines 622, extending from trade plots 624 relative to shadow region or rectangle 620) parallel to the X-axis from each data point. The module may observe or determine for each point the number of intercepts for the point's associated line (operation 516) on the rectangle, e.g. the number of times a line extending from the data point representing the trade, parallel to the X axis, and moving along a direction of increasing X axis magnitude, intersects the rectangle. If for a point the intercept or intercepts is equal to 1 (operation 518) then it may be determined that the data point is inside the rectangle and if the number of intercepts is not equal to 1 it may be deemed to be outside of the rectangle vice versa. The ratio of the subset of trades inside the rectangle to the overall plurality of trades identified for an entity may be determined (operation 520); in another embodiment points inside the rectangle or shadow space to all data points in 2D space (plotted for the same entity) may be calculated. In one embodiment, a process which determines rogue trades using a shadow region or rectangle, may act as a filter to capture traders who have a high proportion of rogue trades, and causes an embodiment to not capture or mark as rogue traders who have sporadic or occasional trades identified as rogue by a weighted average, avoiding false positives. In one embodiment a pattern recognition module and an impact probability (e.g. weighted average) module have their results "AND"ed to produce a final result.

In operation 522 for the subset of trades, a weighted average may be determined of, for each of a plurality of trade surveillance system thresholds, the number of trades meeting each trade surveillance system threshold within a tolerance and not meeting a trade surveillance threshold, times a weight for the threshold, the weight being based on the position of the threshold in the trade surveillance system. This weighted average may be termed a probability.

If the ratio determined in operation 520 is greater than a pre-determined threshold (operation 524) (e.g. defined for a particular innovation system) and the probability or weighed average calculated in operation 522 (e.g., in the impact probability module) is greater than the threshold defined (operation 526) then the entity associated with the analyzed trades is deemed to be a rogue or undesirable trader (operation 528). If a rogue trader or undesirable account is detected, action may be taken. For example, action may include sending a notification to a party (e.g. to an institution handling trades); to put them under a watchlist (operation 530) as a part of automated actions and/or a pause (operation 532) in trades from the rogue trader or account.

While in an example algorithm a shape is drawn and data is plotted in the shape, embodiments may determine which data or trades are "inside" and "outside" the rectangle without actually drawing a rectangle and plotting data in the rectangle. For example, an embodiment may detect rogue or undesirable trading by determining a ratio of trades for an entity that do not meet a trade surveillance system threshold (e.g. has metadata which falls below a threshold which would cause an undesirable trade alert), and also do meet a trade surveillance system threshold within a tolerance, and also fall within a defined (e.g., user set) time period; to all trades for an entity (possibly limited to the same time limiting the numerator).

FIG. 7 depicts a sample user interface according to some embodiments which may be viewed, e.g. on supervisor computer 320, or another device. Information displayed can be, for example, the number and/or identity of total trades, the number and/or identity rogue or undesirable trades detected by an embodiment, the number and/or identity "clean" (e.g., not rogue) trades, and drilled down details of trades related to an entity (e.g. trader or account). A bar graph or other display may show total trades and rogue trades made by a specific entity. A display or chart may show entities which are blocked as part of automated actions taken by an embodiment, and the percentage share of rogue trades with respect to an entity. A section may depict or accept (e.g. via an input device) user inputs for the system such as time limits, thresholds and other settings which may be used by detection algorithms.

Figure 8:
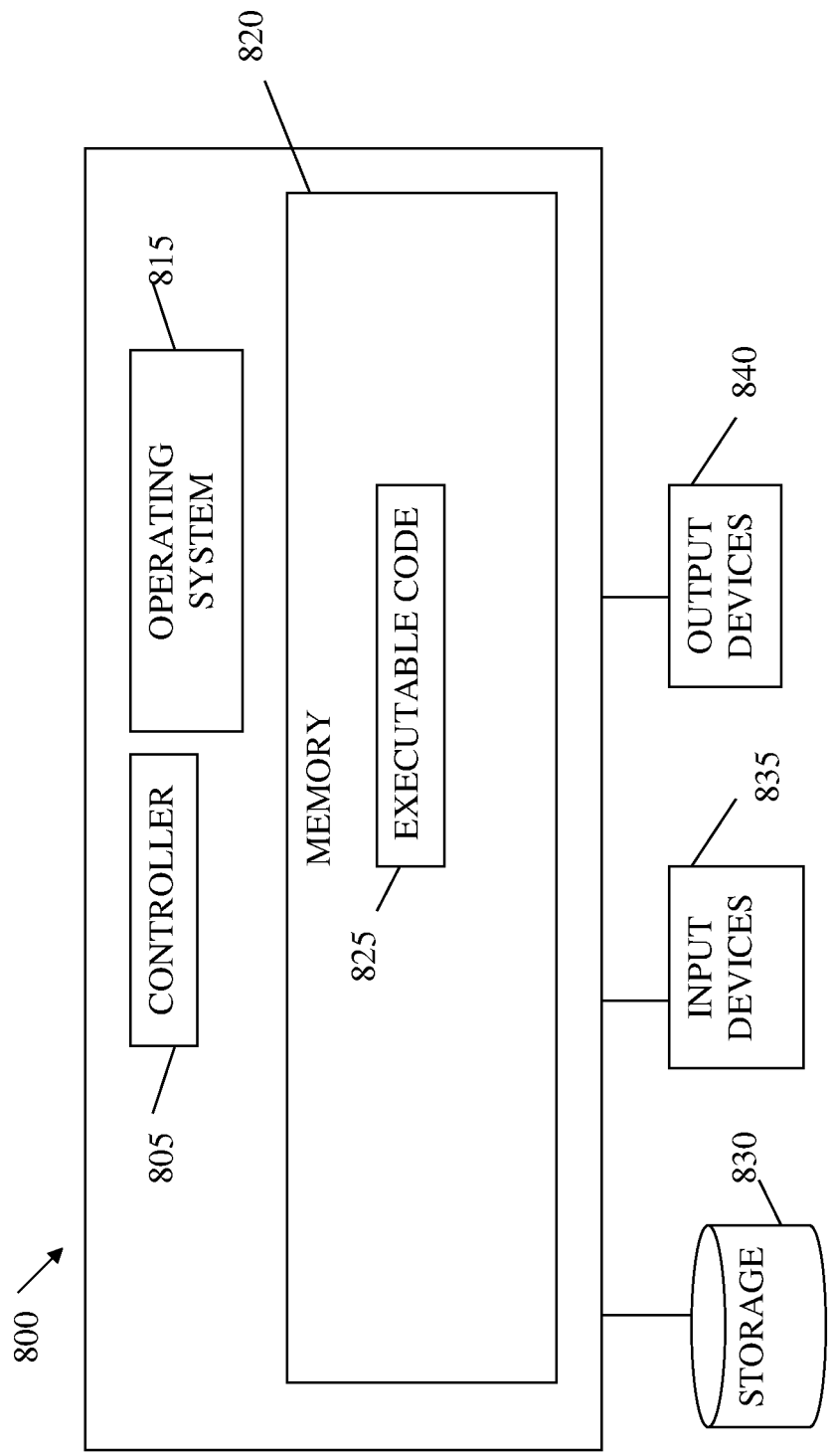
FIG. 8 is a block diagram of a computing device according to embodiments of the present invention.

Reference is made to FIG. 8, showing a non-limiting, block diagram of a computing device or system 800 that may be used for destination determination of routing requests according to some embodiments of the present invention. Computing device 800 may include a controller 805 that may be a hardware controller. For example, computer hardware processor or hardware controller 805 may be, or may include, a central processing unit processor (CPU), a chip or any suitable computing or computational device. Computing system 800 may include a memory 820, executable code 825, a storage system 830 and input/output (I/O) components 835 and 840, respectively. Controller 805 (or one or more controllers or processors, possibly across multiple units or devices) may be configured (e.g., by executing software or code) to carry out methods described herein, and/or to execute or act as the various modules, units, etc., for example by executing software or by using dedicated circuitry. More than one computing devices 800 may be included in, and one or more computing devices 800 may be, or act as the components of, a system according to some embodiments of the invention. For example, computer system 310, rogue detection module 314, surveillance module 312, trade surveillance module 400, analytical models, trader computer 300, and supervisor computer may each be or be executed by a computer such as computing device 800.

Memory 820 may be a hardware memory. For example, memory 820 may be, or may include one or more of machine-readable media for storing software e.g., a Random-Access Memory (RAM), a read only memory (ROM), a memory chip, a Flash memory, a volatile and/or non-volatile memory or other suitable memory units or storage units. Memory 820 may be a computer or processor non-transitory readable medium, or a computer non-transitory storage medium, e.g., a RAM. Some embodiments may include a non-transitory storage medium having stored thereon instructions which when executed cause the processor to carry out methods disclosed herein.

Executable code 825 may be an application, a program, a process, task or script. A program, application or software as referred to herein may be any type of instructions, e.g., firmware, middleware, microcode, hardware description language etc. that, when executed by one or more hardware processors or controllers 805, cause a processing system or device (e.g., system 800) to perform the various functions described herein. Executable code 825 may be executed by controller 805 possibly under control of an operating system.

Storage system 830 may be or may include, for example, a hard disk drive, a CD-Recordable (CD-R) drive, a Blu-ray disk (BD), a universal serial bus (USB) device or other suitable removable and/or fixed storage unit. In some embodiments, for example, when included in a mobile communication device such as a smartphone or laptop computer, storage system may be a memory, e.g., a flash memory or a solid state disk (SSD).

Input components 835 may be, may include, or they may be used for connecting (e.g., via included ports): a mouse; a keyboard; a touch screen or pad or any suitable input device. Output components 840 may include one or more screens, touchscreens, displays or monitors, speakers and/or any other suitable output devices. Any applicable I/O components may be connected to computing device 800 as I/O components 835 and 840, for example, a wired or wireless network interface card (NIC), a universal serial bus (USB) device or an external hard drive.

Figure 9:
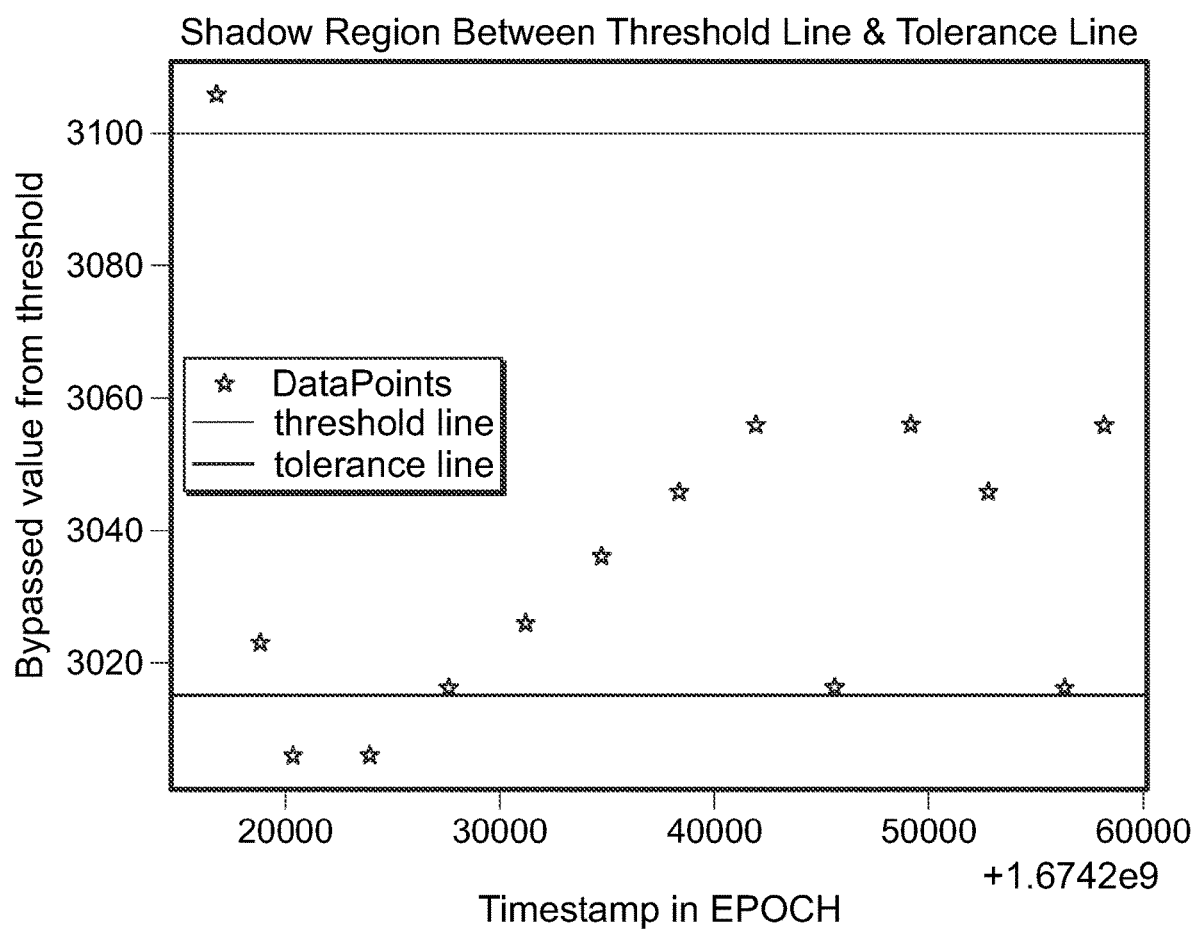
FIG. 9 depicts a shadow region created using sample test data according to embodiments of the present invention.

FIG. 9 depicts a shadow region created using sample test data according to embodiments of the present invention. In FIG. 9, a shadow region is defined, e.g. using the threshold and tolerance received from (e.g. used in) a detection model, and includes test data from example Tables 1 and 2. An algorithm may calculate which data points, representing trades, reside inside the shadow region and which reside outside the shadow region.

Table 1 depicts example input data, and Table 2 depicts the data of Table 1, processed according to an embodiment of the present invention. In Tables 1 and 2 below, the timestamp relates to values in FIG. 9 by adding, to the timestamp (y axis) values in FIG. 9+1.6742+e9 to arrive at the value in Tables 1 and 2.

TABLE 1

| Timestamp | Bypassed Value From Threshold |
|---|---|
| 1674216776 | 3106 |
| 1674218776 | 3023 |
| 1674220376 | 3006 |
| 1674223876 | 3006 |
| 1674227576 | 3016 |
| 1674231176 | 3026 |
| 1674223476 | 3036 |
| 1674238376 | 3046 |
| 1674241976 | 3056 |
| 1674245576 | 3016 |
| 1674249176 | 3056 |
| 1674252776 | 3046 |

TABLE 1-continued

| Timestamp | Bypassed Value From Threshold |
|---|---|
| 1674256376 | 3016 |
| 1674258176 | 3056 |

TABLE 2

| Timestamp | Bypassed Value From Threshold | Region |
|---|---|---|
| 1674216776 | 3106 | Alerted trade above threshold |
| 1674218776 | 3023 | Inside Shadow Region |
| 1674220376 | 3006 | Outside Shadow Region |
| 1674223876 | 3006 | Outside Shadow Region |
| 1674227576 | 3016 | Inside Shadow Region |
| 1674231176 | 3026 | Inside Shadow Region |
| 1674223476 | 3036 | Inside Shadow Region |
| 1674238376 | 3046 | Inside Shadow Region |
| 1674241976 | 3056 | Inside Shadow Region |
| 1674245576 | 3016 | Inside Shadow Region |
| 1674249176 | 3056 | Inside Shadow Region |
| 1674252776 | 3046 | Inside Shadow Region |
| 1674256376 | 3016 | Inside Shadow Region |
| 1674258176 | 3056 | Inside Shadow Region |

An embodiment of the invention may plot the data in Table 1 to produce the result of FIG. 9, then calculate the ratio of data points inside the shadow region to data points outside the region. A threshold, e.g. user defined, may be created, where if the percentage of data points that can lie inside the shadow region, is not greater than this threshold, the trader associated with the data points is not rogue, and if the percentage is greater than the threshold, the trader is deemed rogue. In the example of FIG. 9, the threshold is 80%. In the data plotted in FIG. 9, the ratio percentage is 84.6 which is greater than 80%, hence this is an example of a rogue or undesirable trader. This trader may be paused and put under the watchlist for future reference. In FIG. 9, the number of data points inside the shadow region is 11; the number of data points outside the shadow region and below the threshold is 2; and the total number of data points is 13. The Ratio=(points inside)/(total points)=11/13=0.846–84.6%.

In the description and claims of the present application, each of the verbs, "comprise" "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Some embodiments utilize only some of the features or possible combinations of the features. Variations of embodiments of the invention that are described, and embodiments comprising different combinations of features noted in the described embodiments, will occur to a person having ordinary skill in the art. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A computer-implemented method of detecting undesirable trading, comprising:
   for a plurality of trades not flagged as suspicious by one or more analytical models, the one or more analytical models comprising: a marking the close model, and a front running model:
   detecting a subset of trades among the plurality of trades, where each trade in the subset:
      does not meet a trade surveillance system threshold, wherein the surveillance system threshold if met would cause the triggering of an undesirable trade alert, and does meet the trade surveillance system threshold within a tolerance, and falls within the same time period;
   wherein the detecting of the subset of trades is performed using a linear regression machine learning (ML) model, the ML model detecting which one or more trades of the subset of trades are inside a plotted rectangle, the plotted rectangle defined by the threshold and the tolerance, wherein the plotted rectangle is defined by a plurality of linear equations, wherein the detecting of the subset of trades is performed using metadata, the metadata extracted from one or more of the trades, wherein the metadata is compared to the surveillance system threshold to trigger an alert, and wherein the detecting of the subset of trades is performed based on a likelihood for a trade being rogue, the likelihood for a trade being rogue based on a position of the surveillance system threshold relative to other thresholds in one or more of the analytical models;
   determining a ratio of the subset of trades to the plurality of trades;
   if the ratio is above a threshold, determining that the subset of trades corresponds to undesirable trading; and
   if it is determined that the subset of trades corresponds to undesirable trading, performing an action from the group consisting of: sending a notification to a party, causing trading associated with an entity to be paused, and placing the entity on a watchlist.

2. The method of claim 1, comprising:
   determining a weighted average of, for each of a plurality of trade surveillance system thresholds, the number of trades in the subset meeting the trade surveillance system threshold within a tolerance and not meeting a trade surveillance threshold, times a weight for the threshold, the weight being based on the position of the threshold in the trade surveillance system; and
   determining a set of trades corresponds to undesirable trading if the ratio is above a threshold and if the weighted average is above a threshold.

3. The method of claim 1, wherein a trade which does not meet a trade surveillance system threshold comprises metadata which falls below a threshold which if met would cause the triggering of an undesirable trade alert.

4. The method of claim 1, wherein each trade in the plurality of trades is associated with the same entity.

5. The method of claim 1, wherein a trade that does not meet a trade surveillance system threshold, and does meet a trade surveillance system threshold within a tolerance has metadata that does not meet a trade surveillance system threshold and does meet a trade surveillance system threshold within a tolerance.

6. A system for detecting undesirable trading, comprising:
   a memory; and
   a processor configured to:
   for a plurality of trades not flagged as suspicious by one or more analytical models, the one or more analytical models comprising: a marking the close model, and a front running model:
   detect a subset of trades among the plurality of trades, where each trade in the subset:
      does not meet a trade surveillance system threshold, wherein the surveillance system threshold if met would cause the triggering of an undesirable trade alert, and does meet the trade surveillance system threshold within a tolerance, and falls within the same time period;
   wherein the detecting of the subset of trades is performed using a linear regression machine learning (ML) model, the ML model detecting which one or more trades of the subset of trades are inside a plotted rectangle, the plotted rectangle defined by the threshold and the tolerance, wherein the plotted rectangle is defined by a plurality of linear equations, wherein the detecting of the subset of trades is performed using metadata, the metadata extracted from one or more of the trades, wherein the metadata is compared to the surveillance system threshold to trigger an alert, and wherein the detecting of the subset of trades is performed based on a likelihood for a trade being rogue, the likelihood for a trade being rogue based on a position of the surveillance system threshold relative to other thresholds in one or more of the analytical models;
   determine a ratio of the subset of trades to the plurality of trades;
   if the ratio is above a threshold, determine that the subset of trades corresponds to undesirable trading; and
   if it is determined that the subset of trades corresponds to undesirable trading, performing an action from the group consisting of: sending a notification to a party, causing trading associated with an entity to be paused, and placing the entity on a watchlist.

7. The system of claim 6, wherein the processor is configured to:
   determine a weighted average of, for each of a plurality of trade surveillance system thresholds, the number of trades in the subset meeting the trade surveillance system threshold within a tolerance and not meeting a trade surveillance threshold, times a weight for the threshold, the weight being based on the position of the threshold in the trade surveillance system; and
   determine that a set of trades corresponds to undesirable trading if the ratio is above a threshold and if the weighted average is above a threshold.

8. The system of claim 6, wherein a trade which does not meet a trade surveillance system threshold comprises metadata which falls below a threshold which if met would cause the triggering of an undesirable trade alert.

9. The system of claim 6, wherein each trade in the plurality of trades is associated with the same entity.

10. The system of claim 6, wherein a trade that does not meet a trade surveillance system threshold, and does meet a trade surveillance system threshold within a tolerance has metadata that does not meet a trade surveillance system threshold and does meet a trade surveillance system threshold within a tolerance.

11. A computer-implemented method of detecting rogue trading, comprising:
- determining on a graph a shadow region defined by a time window, a threshold for determining a rogue trade, wherein the threshold if met would cause the triggering of an undesirable trade alert, and a tolerance altering the amount of the threshold;
- plotting on the graph trades corresponding to an entity, the trades not flagged as suspicious by one or more analytical models, the one or more analytical models comprising: a marking the close model, and a front running model;
- determining for each plotted trade a subset of trades lying inside the shadow region, wherein the determining of the subset of trades is performed using a linear regression machine learning (ML) model, the ML model detecting which one or more of the plotted trades are inside a plotted rectangle, the plotted rectangle defined by the threshold and the tolerance, wherein the plotted rectangle is defined by a plurality of linear equations, wherein the detecting of the subset of trades is performed using metadata, the metadata extracted from one or more of the trades, wherein the metadata is compared to the threshold to trigger an alert, and wherein the determining of the subset of trades is performed based on a likelihood for a trade being rogue, the likelihood for a trade being rogue based on a position of the threshold relative to other thresholds in one or more of the analytical models;
- determining a ratio of the subset of trades to the trades corresponding to the entity; and
- if the ratio is above a threshold, determining that the subset of trades corresponds to rogue trading; and
- if it is determined that the subset of trades corresponds to undesirable trading, performing an action from the group consisting of: sending a notification to a party, causing trading associated with the entity to be paused, and placing the entity on a watchlist.

12. The method of claim 11, comprising:
- determining a weighted average of, for each of a plurality of trade surveillance system thresholds, the number of trades in the subset meeting the trade surveillance system threshold within a tolerance and not meeting a trade surveillance threshold, times a weight for the threshold, the weight being based on the position of the threshold in the trade surveillance system; and
- determining that a set of trades corresponds to undesirable trading if the ratio is above a threshold and if the weighted average is above a threshold.

13. The method of claim 12, wherein a trade which does not meet a trade surveillance system threshold comprises metadata which falls below a threshold which if met would cause the triggering of an undesirable trade alert.

14. The method of claim 12, wherein each trade in the plurality of trades is associated with the same entity.

15. The method of claim 11, wherein a trade meeting a trade surveillance system threshold within a tolerance and not meeting a trade surveillance threshold has metadata that meets the trade surveillance system threshold within a tolerance and not meeting a trade surveillance threshold.

\* \* \* \* \*